(12) United States Patent
Arntz

(10) Patent No.: US 7,054,596 B2
(45) Date of Patent: May 30, 2006

(54) WIRELESS VIBRATION DIAGNOSTIC INSTRUMENT

(75) Inventor: Robert T Arntz, Auburn Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 382 days.

(21) Appl. No.: 10/032,371

(22) Filed: Dec. 21, 2001

(65) Prior Publication Data

US 2003/0119448 A1 Jun. 26, 2003

(51) Int. Cl.
*H04B 7/04* (2006.01)

(52) U.S. Cl. ............... 455/66.1; 455/423; 455/424; 455/67.11; 455/99; 455/3.06; 455/404.2; 340/426; 340/988

(58) Field of Classification Search ............ 455/66.1, 455/556.1, 67.11, 423, 422, 424; 340/438, 340/439, 653, 660, 988, 426
See application file for complete search history.

(56) References Cited

U.S. PATENT DOCUMENTS

| | | | |
|---|---|---|---|
| 5,231,355 A * | 7/1993 | Rider et al. ............... 324/326 |
| 5,281,949 A * | 1/1994 | Durley et al. ............. 340/433 |
| 5,319,716 A | 6/1994 | McGreevy | |
| 5,435,185 A * | 7/1995 | Eagan ....................... 73/587 |
| 5,445,026 A | 8/1995 | Eagan | |
| 5,553,489 A * | 9/1996 | Connell et al. ............ 73/118.1 |
| 5,758,311 A * | 5/1998 | Tsuji et al. ................ 701/111 |
| 5,793,120 A | 8/1998 | Solow | |
| 5,850,188 A * | 12/1998 | Doyle et al. ............. 340/825.69 |
| 5,862,235 A | 1/1999 | Kowalczyk | |
| 5,867,794 A | 2/1999 | Hayes et al. | |
| 5,920,631 A | 7/1999 | Andres | |
| 5,946,604 A | 8/1999 | Bailey | |
| 5,968,191 A * | 10/1999 | Thatcher et al. ............ 714/723 |
| 5,970,390 A | 10/1999 | Koga et al. | |
| 5,974,856 A * | 11/1999 | Elie et al. ................. 73/11.04 |
| 6,008,599 A * | 12/1999 | Beck ........................ 318/254 |
| 6,023,616 A | 2/2000 | Briskman | |
| 6,028,537 A * | 2/2000 | Suman et al. ............. 340/988 |
| 6,138,109 A * | 10/2000 | Grichnik et al. ............ 706/20 |
| 6,175,787 B1* | 1/2001 | Breed ........................ 701/29 |
| 6,326,704 B1* | 12/2001 | Breed et al. ............... 307/9.1 |
| 6,356,822 B1* | 3/2002 | Diaz et al. ................. 701/33 |
| 6,360,607 B1 | 3/2002 | Charette et al. | |
| 6,526,352 B1* | 2/2003 | Breed et al. ............... 701/213 |
| 6,677,854 B1* | 1/2004 | Dix .......................... 340/438 |

OTHER PUBLICATIONS

STEELMAN Electronic Testing Equipment, Chassis Ear STE 06600 from STEELMAN website, http://www.qualitytools.nl/nl/product_overview.asp?cat+steelman-13.

* cited by examiner

*Primary Examiner*—Marceau Milord
(74) *Attorney, Agent, or Firm*—Ralph E. Smith

(57) ABSTRACT

A vibration diagnostic instrument for use by an automotive maintenance mechanic. The vibration diagnostic instrument includes a sensor, which senses vibrations and generates a sensor signal in response thereto, and a controller. The controller is coupled to the sensor and receives the sensor signal. The controller includes a transmitter portion that generates a diagnostic signal responsive to the sensor signal. The transmitter portion transmits the diagnostic signal over radio waves so that it may be received by an appropriate receiver, such as a conventional FM receiver.

20 Claims, 6 Drawing Sheets

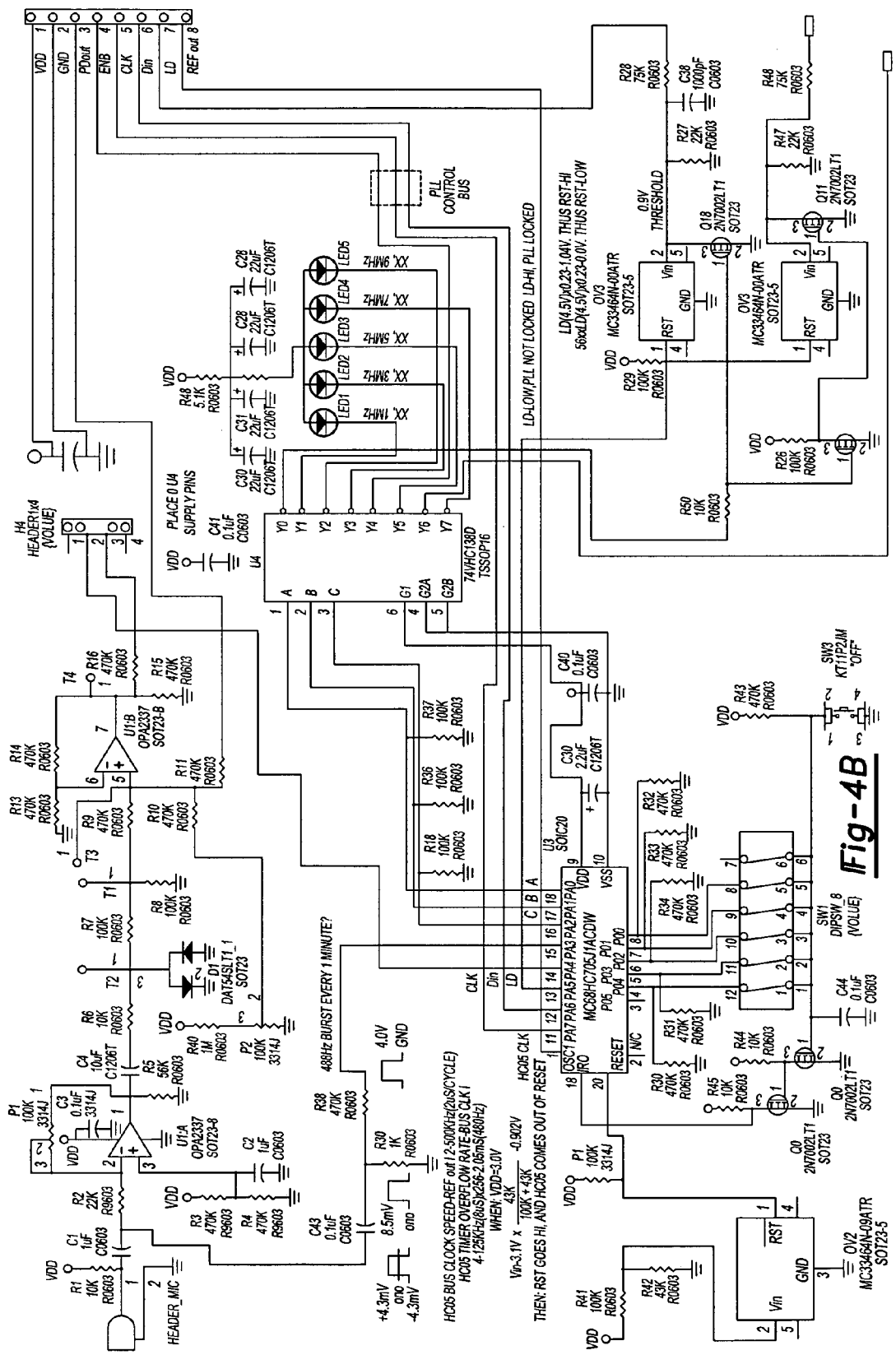

WIRELESS VIBRATION DIAGNOSTIC INSTRUMENT

FIELD OF THE INVENTION

The present invention generally relates to instrumentation for detecting, locating and diagnosing automotive chassis sounds. More particularly, the present invention is directed to electronic diagnostic instrumentation for locating the source and cause, in automotive vehicles, of under-chassis, under-hood and under-dash problem sounds and noises.

BACKGROUND OF THE INVENTION

Diagnostic tools that aid technicians in determining the source or sources of noise and vibration are known in the art. One such diagnostic tool is the ChassisEAR marketed by JS Products, Inc. This device is marketed as an electronic squeak and rattle finder and has several sensitive piezoelectric microphones mounted in alligator-type clamps available for attachment to a variety of vehicle components and structural elements where vibration that results from mechanical failure is suspected. The microphones of this device are coupled via electrical leads to a control box which includes vibration signal conversion circuitry for producing audible signals. The control box also includes switching means for selectively interconnecting each individual clamp microphone to the signal conversion circuitry and thereby selective connection to earphones for use by automotive repair technicians in determining through audible signal levels and signal types the locations and cause of a particular sound or noise that is generated during the operation of the vehicle.

Despite these advancements in the diagnostic capabilities of automotive repair technicians, several drawbacks have been noted with tools of this type. One such drawback relates to the wires that interconnect the clamp microphones and the control box. These wires are typically tie-wrapped to the chassis of the vehicle and fed through windows into the passenger compartment where they are then coupled to the control box. Great care is typically taken to secure and festoon the wires to thereby ensure that the wires are not entangled with a moving or rotating part of the vehicle or otherwise damaged during the operation of the vehicle.

SUMMARY OF THE INVENTION

In one preferred form, the present invention provides a vibration diagnostic instrument for use by an automotive maintenance mechanic. The vibration diagnostic instrument includes a sensor, which senses vibrations and generates a sensor signal in response thereto, and a controller. The controller is coupled to the sensor and receives the sensor signal. The controller includes a transmitter portion that generates a diagnostic signal responsive to the sensor signal. The transmitter portion transmits the diagnostic signal over radio waves so that it may be received by an appropriate receiver, such as a conventional FM receiver.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIGS. 4A through 4C are schematic illustrations of a portion of the diagnostic tool of FIG. 1 illustrating the circuitry of the controller in detail.

DETAILED DESCRIPTION OF THE PREFERRED EMBODIMENTS

Figure 1:
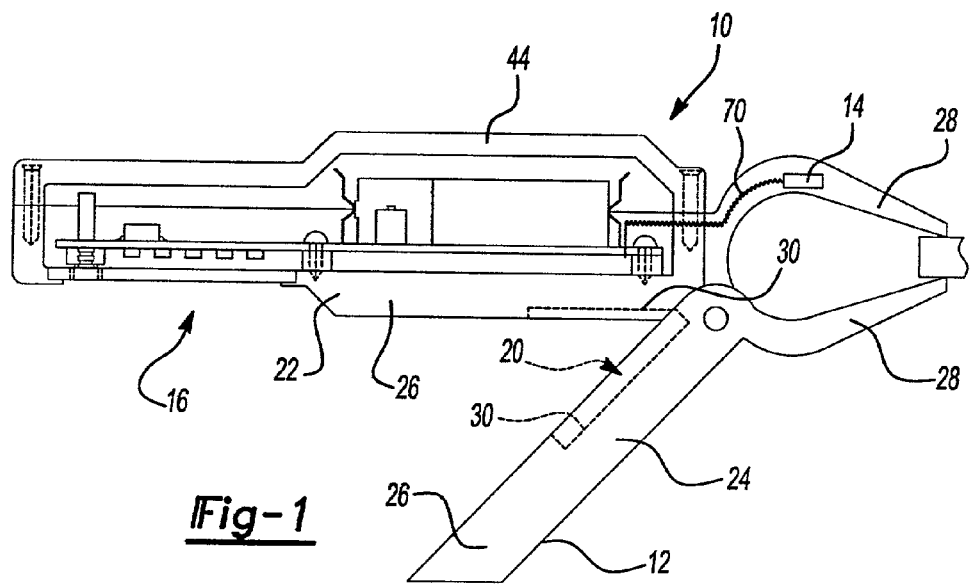
FIG. 1 is a side view in partial section of a diagnostic tool constructed in accordance with the teachings of the present invention.
Figure 2:
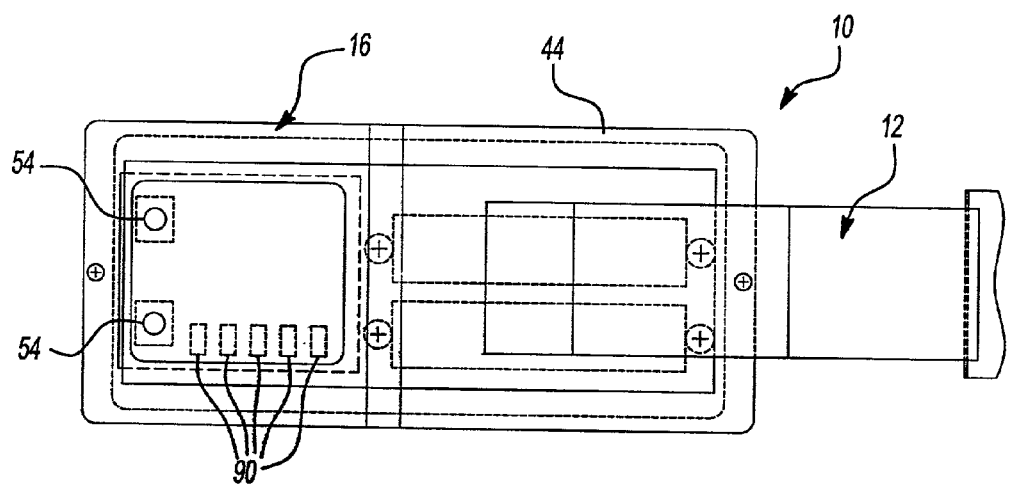
FIG. 2 is a partial bottom view of a portion of the diagnostic tool of FIG. 1.

With reference to FIGS. 1 and 2 of the drawings, a diagnostic tool constructed in accordance with the teachings of the present invention is generally indicated by reference numeral 10. The diagnostic tool 10 is illustrated to include a clamp 12, a vibration sensor 14 and a controller 16. The clamp 12 includes a clamp spring 20, a first clamp half 22 and a second clamp half 24. Each of the first and second clamp halves 22 and 24 includes a generally straight handle portion 26 and an arcuate jaw portion 28 that is coupled to the handle portion 26. The first and second clamp halves 22 and 24 are pivotably coupled to one another such that the clamp spring 20 is disposed between the handle portions 26 of the first and second clamp halves 22 and 24. The clamp spring 20 is a conventional torsion spring having legs 30 which force the handle portions 26 of the first and second clamp halves 22 and 24 away from one another to thereby bias the jaw portions 28 toward one another.

The vibration sensor 14 may be any vibration sensing device, such as a microphone or an accelerometer, which is coupled to the clamp 12 in a manner that permits the vibration sensor 14 to sense vibrations that are transmitted to the clamp 12. In the particular embodiment illustrated, the vibration sensor 14 is a piezoelectric bender that is molded into the jaw portion 28 of the first clamp half 22. The vibration sensor 14 senses vibrations that are transmitted to the clamp 12 and responsively generates a sensor signal.

Figure 3:
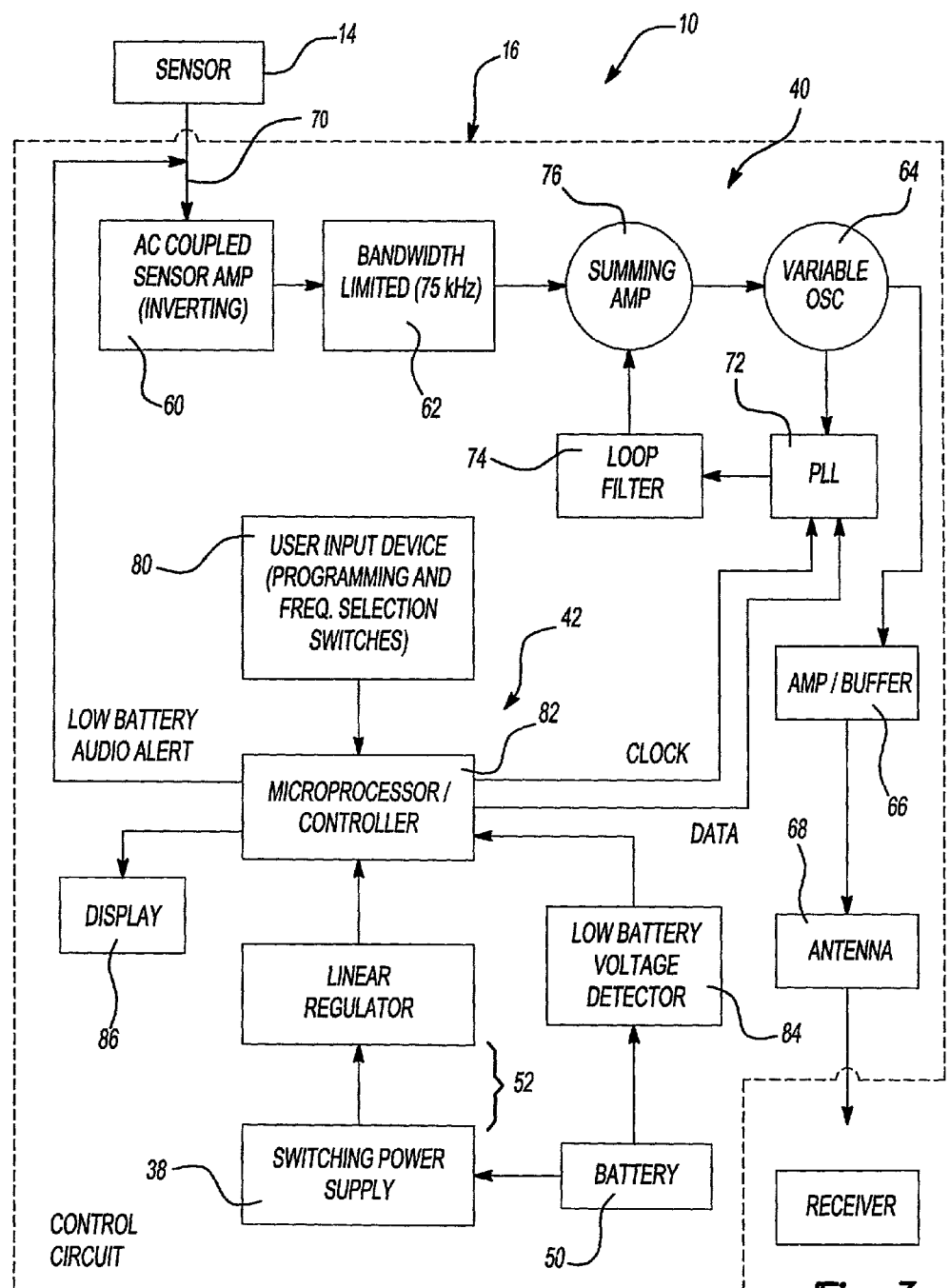
FIG. 3 is a schematic illustration of the diagnostic tool of FIG. 1.

As illustrated in FIGS. 2 and 3, the controller 16 of the embodiment provided includes a power source 38, a transmitter portion 40, a microprocessor portion 42 and a housing shell 44 that mates to the handle portion 26 of the first clamp half 22 and covers the power source 38, transmitter portion 40 and microprocessor portion 42. The power source 38 is illustrated to include a conventional battery source, such as a pair of AA sized batteries 50, a conventional switching power supply 52, and one or more power control switches 54 for changing the operational state of the controller 16 between an active state and an inactive state. When the controller 16 is operated in the active state, the switching power supply 52 pulses the battery power through an internal transformer and rectifies the output of the internal transformer to produce higher voltage power for the operation of the sensor 14, the transmitter portion 40 and the microprocessor portion 42.

The transmitter portion 40 receives the sensor signal from the vibration sensor 14, generates a diagnostic signal in response to the sensor signal and transmits the diagnostic signal over radio waves to an appropriate receiver. The microprocessor portion 42 performs higher level functions, such as monitoring the strength of the batteries 50. The transmitter portion 40 is illustrated to include a sensor amplifier 60, a bandwidth limiter 62, an oscillator 64, a conventional buffer 66 and an antenna 68. The sensor amplifier 60, which is coupled to the vibration sensor 14 via a wire 70, receives and amplifies the sensor signal. The amplified signal is transmitted to the bandwidth limiter 62, which, in the particular embodiment illustrated, limits the bandwidth of the amplified sensor signal to about ±75 kHz to comply with FCC requirements. The amplified, bandwidth limited sensor signal is transmitted to the oscillator 64 which generates a diagnostic signal that is transmitted in a radio frequency format via the antenna 68 to an appropriate receiver. The oscillator 64 preferably transmits over an FM frequency band that in the range of about 87.9 MHz to about 92.9 MHz. The oscillator 64 may be of the type that is permanently tuned to a predetermined frequency, but is preferably a Colpitts type variable frequency oscillator that is controlled by the microprocessor portion 42 via conventional means, such as the phase lock loop 72, loop filter 74 and summing amplifier 76 that are illustrated in the example provided.

Figure 4A:
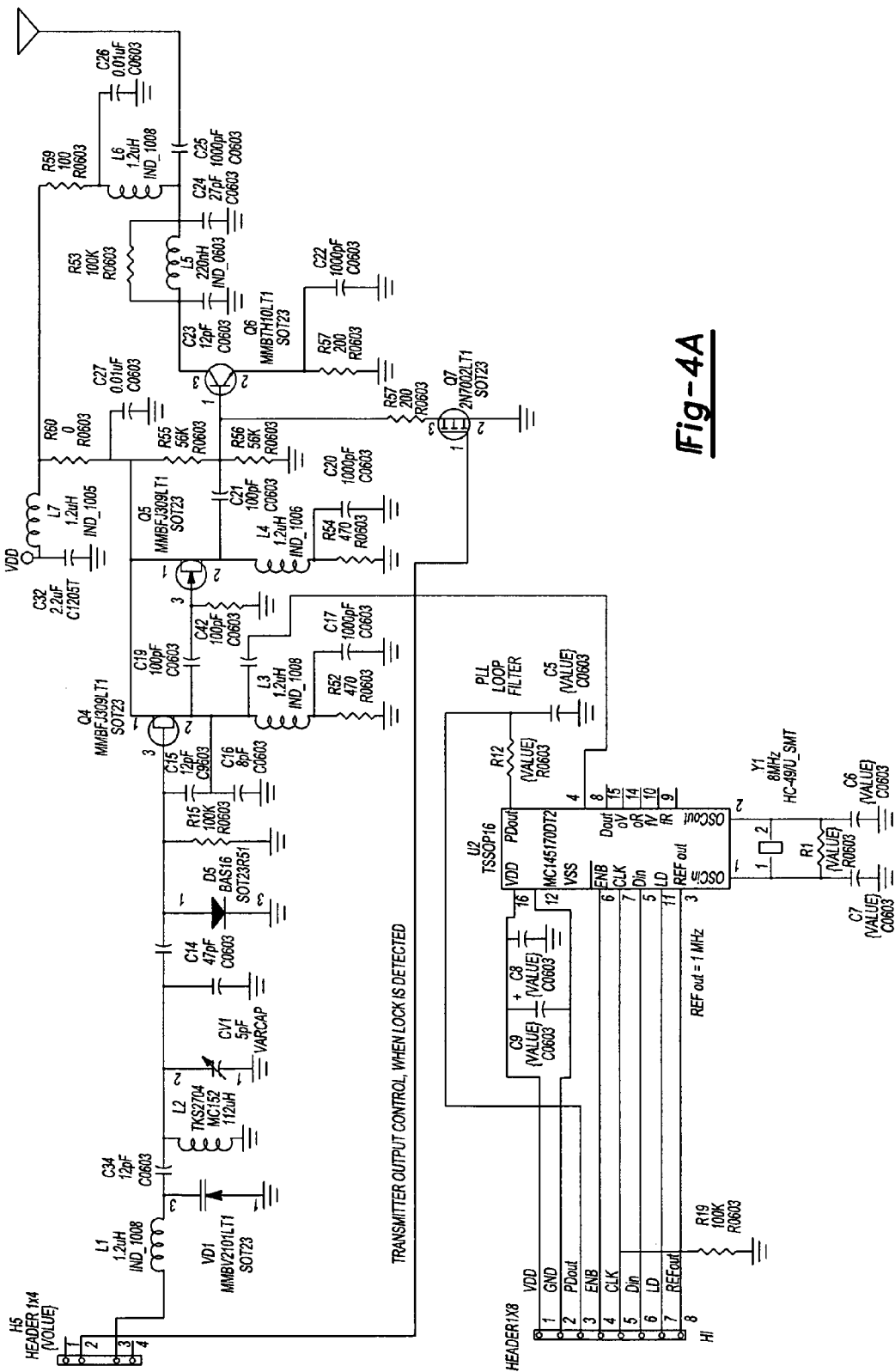
Figure 4C:
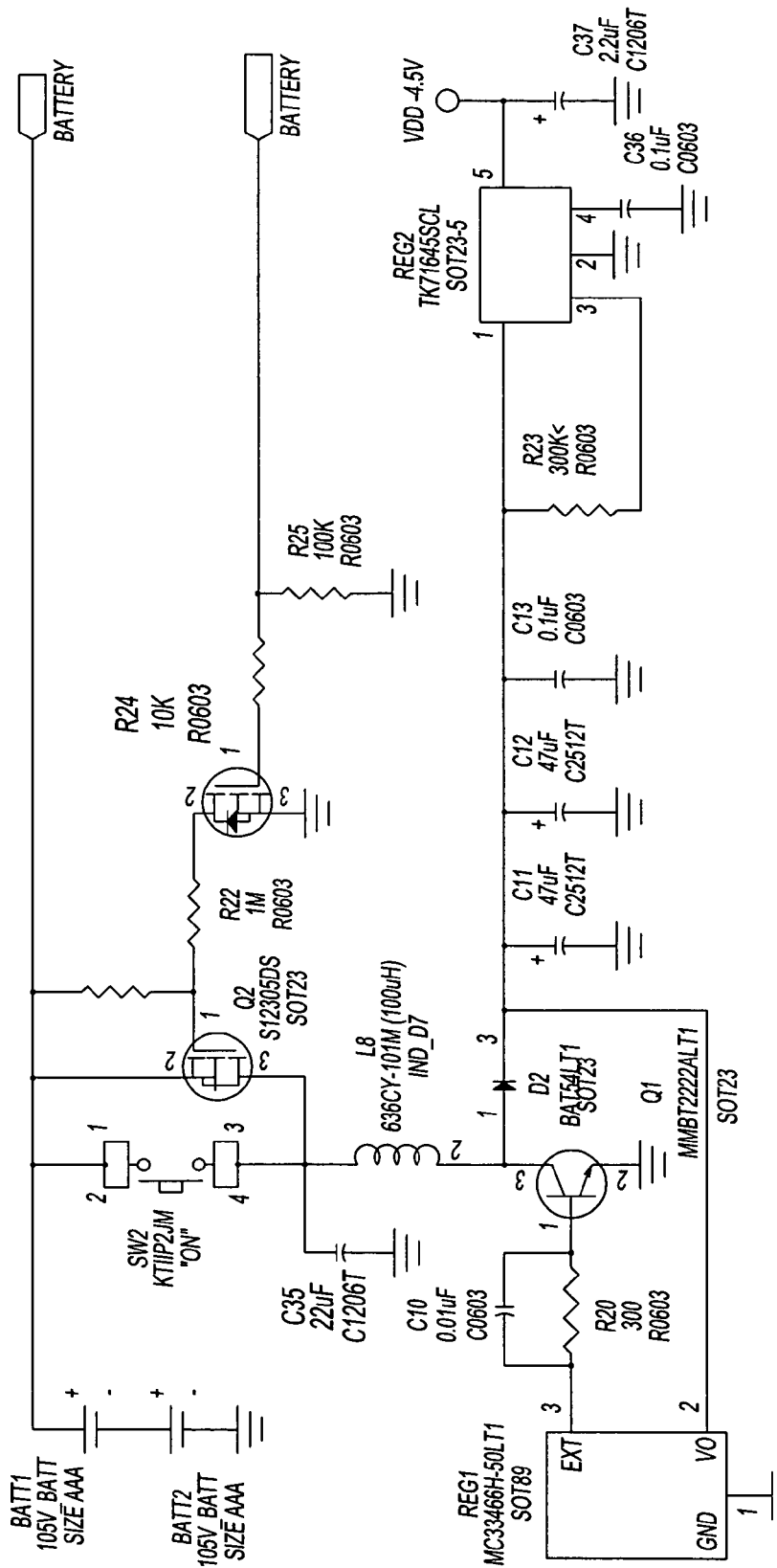

The microprocessor portion 42, while not essential to the present invention, provides the diagnostic tool 10 with a relatively high degree of sophistication. With additional reference to FIGS. 4A through 4C, the microprocessor portion 42 includes a plurality of channel selection switches 80, a microprocessor 82, a low voltage detector 84, a display 86 and the means for controlling the variable frequency oscillator (i.e., the phase lock loop 72, loop filter 74 and summing amplifier 76). The channel selection switches 80 may be any appropriate switch that would permit the user of the diagnostic tool 10 to select a particular FM frequency band, but are illustrated as being binary coded decimal switches in the particular embodiment illustrated so as to reduce the overall cost of the diagnostic tool 10.

The microprocessor 82 is coupled to the channel selection switches 80 and controls the operation of the phase lock loop 72 in response to the setting of the channel selection switches 80. The microprocessor 82 is also coupled to the display 86 and causes the display 86 to identify the particular FM frequency band that has been selected for the transmission of the diagnostic signal. In the example provided, the display 86 is shown to utilize a plurality of light emitting diodes 90 for identifying the selected FM frequency band, rather than an LCD-type alpha-numeric display, so as to reduce the overall cost of the diagnostic tool 10. The microprocessor 82 controls the supply of power to the transmitter portion 40 and the phase lock loop 72 to automatically power down if the phase lock loop 72 is out of lock or if the diagnostic tool 10 has been in use for a predetermined time, such as one hour. The microprocessor 82 and display 86 also permit data to be displayed to the user, such as the operational state of the controller 16, the condition of the batteries 50 and whether the phase lock loop 72 has fallen out of lock.

The low voltage detector 84 is a circuit that monitors the voltage of the batteries 50 and generates a low voltage signal in response to the detection of a voltage that is less than a predetermined voltage. The microprocessor 82 is coupled to the low voltage detector 84 and in response to receipt of the low voltage signal, the microprocessor 82 controls the phase lock loop 72 such that an audio alert is forwarded to the oscillator 64 for transmission to the receiver.

Figure 5:
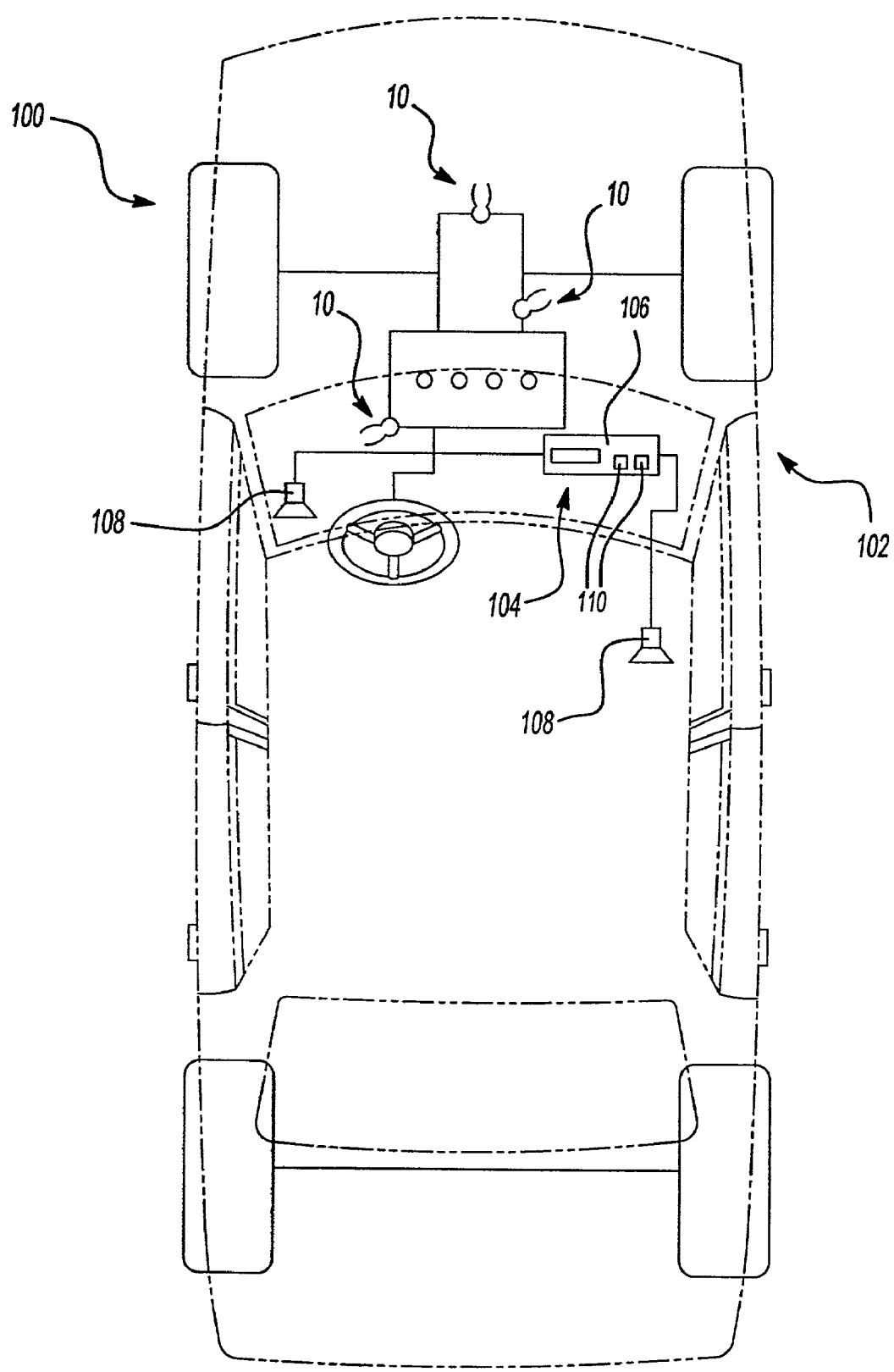
FIG. 5 is a schematic view of a diagnostic system that utilizes the diagnostic tool of FIG. 1.

In FIG. 5, a diagnostic system 100 according to the present invention is illustrated in operative association with an automotive vehicle 102. The diagnostic system 100 is illustrated to include a plurality of the diagnostic tools 10 and a conventional vehicle stereo system 104 having an FM receiver/amplifier 106 and speakers 108. Each of the diagnostic tools 10 is set via the channel selection switches 80 to transmit data over a different FM frequency band and coupled to a different structural element or component on the vehicle 102. The FM receiver 106 is preferably a digital receiver, having a plurality of programmable presets 110 that have been programmed to the FM frequency bands of the diagnostic tools 10.

During the operation of the vehicle 102, data from the diagnostic tools 10 is transmitted over the preselected FM frequency bands and selectively received by the FM receiver 106 based on the frequency to which the FM receiver 106 has been tuned. The diagnostic signal transmitted by the desired diagnostic tool 10 is received and amplified by the FM receiver 106 and converted into sound waves by the speakers 108. The relatively high degree of fidelity with which the FM receiver 106 and speakers 108 convert the diagnostic signal into sound waves does much to aid the automotive repair technician to properly identify and locate the source of problematic noises within the vehicle. Furthermore, as the automotive repair technician may actuate the presets 110 to switch the frequency of the FM receiver 106, the automotive repair technician is able to rapidly toggle between the various diagnostic tools 10 and thereby greatly expedite the process of identifying and locating the source of problematic noises within the vehicle.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A vibration diagnostic instrument for use by an automotive maintenance mechanic, the vibration diagnostic instrument comprising:

an instrument housing having a coupling mechanism adapted for releasably coupling the instrument housing to a preselected location on a vehicle;

a sensor positioned at the coupling mechanism for sensing vibrations and generating a sensor signal in response thereto; and a controller resident in the instrument housing and coupled to the sensor for receipt of the sensor signal, the controller including a transmitter portion that generates a diagnostic signal based on the received sensor signal, the transmitter portion wirelessly transmitting the diagnostic signal for receipt by a remotely located receiver.

2. The vibration diagnostic instrument of claim 1, wherein the diagnostic signal comprises radio waves transmitted over an FM frequency band.

3. The vibration diagnostic instrument of claim 2, wherein the FM frequency band is in the range of about 87.9 MHz to about 92.9 MHz.

4. The vibration diagnostic instrument of claim 3, wherein the FM frequency band may be selectively changed between a plurality of predetermined FM radio frequency bands in the range of about 87.9 MHz to about 92.9 MHz.

5. The vibration diagnostic instrument of claim 2, wherein the transmitter portion includes a bandwidth limiter for limiting the bandwidth of the diagnostic signal.

6. The vibration diagnostic instrument of claim 5, wherein the bandwidth limiter limits the bandwidth of the diagnostic signal to about ±75 kHz.

7. The vibration diagnostic instrument of claim 1, wherein a radio frequency band over which the diagnostic signal is transmitted may be selected from a plurality of predetermined radio frequency bands.

8. The vibration diagnostic instrument of claim 1, wherein the controller further includes a microprocessor portion that is configured to automatically power the vibration diagnostic instrument down after a predetermined amount of time has elapsed.

9. The vibration diagnostic instrument of claim 1, further comprising a power source, the power source including a battery and a switching power supply.

10. The vibration diagnostic instrument of claim 9, wherein the power source further includes a voltage detector for monitoring a voltage of the battery, the voltage detector being configured to detect when the voltage of the battery is less than a predetermined voltage threshold and to responsively generate a low voltage signal.

11. The vibration diagnostic instrument of claim 1 wherein the remotely located receiver comprises a conventional audio system of the vehicle.

12. A vibration diagnostic instrument for use by an automotive maintenance mechanic, the vibration diagnostic instrument comprising:
an instrument housing including a clamp that is configured to be coupled to a component or a structure of an automotive vehicle;
a sensor coupled to the clamp, the sensor being operable for sensing vibrations and generating a sensor signal in response thereto; and
a controller resident in the instrument housing and coupled to the sensor for receipt of the sensor signal, the controller including a transmitter portion that generates a diagnostic signal based on the received sensor signal, the transmitter portion wirelessly transmitting the diagnostic signal for receipt by a remotely located receiver.

13. The vibration diagnostic instrument of claim 12, wherein the clamp includes a pair of clamp halves and a spring, the damp halves being pivotably coupled to one another, each of the clamp halves including a jaw portion, the spring exerting a force onto the clamp halves that biases the jaw portions toward one another, the sensor being coupled to one of the jaw portions.

14. The vibration diagnostic instrument of claim 12, wherein the sensor is a piezoelectric bender.

15. The vibration diagnostic instrument of claim 12, wherein the diagnostic signal comprises radio waves transmitted over an FM frequency band.

16. The vibration diagnostic Instrument of claim 15, wherein the FM frequency band is in the range of about 87.9 MHz to about 92.9 MHz.

17. The vibration diagnostic instrument of claim 16, wherein the FM frequency band may be selectively changed between a plurality of predetermined FM radio frequency bands in the range of about 87.9 MHz to about 92.9 MHz.

18. The vibration diagnostic instrument of claim 15, wherein the bandwidth limiter limits the bandwidth of the diagnostic signal to about ±75 kHz.

19. The vibration diagnostic instrument of claim 12, wherein a radio frequency band over which the diagnostic signal is transmitted may be selected from a plurality of predetermined radio frequency bands.

20. The vibration diagnostic instrument of claim 12 wherein the remotely located receiver comprises a conventional audio system of the vehicle.

* * * * *